(12) United States Patent
Yen et al.

(10) Patent No.: US 7,779,482 B1
(45) Date of Patent: Aug. 17, 2010

(54) DELIVERY OF LICENSE INFORMATION USING A SHORT MESSAGING SYSTEM PROTOCOL IN A CLOSED CONTENT DISTRIBUTION SYSTEM

(75) Inventors: Wei Yen, Los Altos Hills, CA (US);
John Princen, Cupertino, CA (US);
Raymond Lo, Mountain View, CA (US);
Pramila Srinivasan, Palo Alto, CA (US)

(73) Assignee: iGware Inc, Mountain View, CA (US)

( * ) Notice: Subject to any disclaimer, the term of this patent is extended or adjusted under 35 U.S.C. 154(b) by 400 days.

(21) Appl. No.: 10/727,332

(22) Filed: Dec. 2, 2003

Related U.S. Application Data

(63) Continuation-in-part of application No. 10/360,827, filed on Feb. 7, 2003, and a continuation-in-part of application No. 10/703,149, filed on Nov. 5, 2003.

(51) Int. Cl.
*G06F 7/14* (2006.01)
*G06F 17/30* (2006.01)
*H04N 7/16* (2006.01)

(52) U.S. Cl. .............................. 726/30; 726/2; 455/466

(58) Field of Classification Search .................... 726/1, 726/30; 455/466
See application file for complete search history.

(56) References Cited

U.S. PATENT DOCUMENTS

| | | | |
|---|---|---|---|
| 5,095,798 A | 3/1992 | Okada et al. | |
| 5,184,830 A | 2/1993 | Okada et al. | |
| 5,238,250 A | 8/1993 | Leung et al. | |
| 5,261,069 A | 11/1993 | Wilkinson et al. | |
| 5,367,698 A | 11/1994 | Webber et al. | |
| 5,404,505 A | 4/1995 | Levinson | |
| 5,426,763 A | 6/1995 | Okada et al. | |

(Continued)

FOREIGN PATENT DOCUMENTS

EP 0 992 922 A1 4/2000

(Continued)

OTHER PUBLICATIONS

Arbaugh, William A., et al., "A Secure and Reliable Bootstrap Architecture," University of Pennsylvania (1996).

(Continued)

*Primary Examiner*—Farid Homayounmehr
(74) *Attorney, Agent, or Firm*—Perkins Coie LLP

(57) ABSTRACT

Delivery of licenses in a closed distribution system including a playback device and secure processor. The secure processor allows only use of authorized content, and the playback device is authorized to execute content. A user requests a license to selected content using a communication link, without the playback device, outside the closed content system to a license server. The user requests licenses using SMS, sending small amounts of information, possibly including proofs of purchase. The server responds using SMS, providing the user with a code representing information interpretable as a license, such as an encrypted content key or a shared secret known to the user. The user, using a keypad or other device, inputs that code to the playback device, which determines if it authorizes use of the content. The playback device authenticates the license, determining whether that license authorizes the user for the content, and enforces the licensed rights.

55 Claims, 2 Drawing Sheets

U.S. PATENT DOCUMENTS

| | | | |
|---|---|---|---|
| 5,528,513 A | 6/1996 | Vaitzblit et al. | |
| 5,577,209 A * | 11/1996 | Boyle et al. | 726/4 |
| 5,586,264 A | 12/1996 | Belknap et al. | |
| 5,590,199 A | 12/1996 | Krajewski, Jr. et al. | |
| 5,610,839 A | 3/1997 | Karolak et al. | |
| 5,638,443 A | 6/1997 | Stefik et al. | |
| 5,715,398 A | 2/1998 | Lubenow et al. | |
| 5,715,403 A | 2/1998 | Stefik | |
| 5,765,152 A | 6/1998 | Erickson | |
| 5,781,901 A | 7/1998 | Kuzma | |
| 5,786,587 A | 7/1998 | Colgate, Jr. | |
| 5,790,170 A | 8/1998 | Suzuki | |
| 5,799,086 A * | 8/1998 | Sudia | 705/76 |
| 5,805,712 A | 9/1998 | Davis | |
| 5,809,242 A | 9/1998 | Shaw et al. | |
| 5,815,662 A | 9/1998 | Ong | |
| 5,818,512 A | 10/1998 | Fuller | |
| 5,829,046 A | 10/1998 | Tzelnic et al. | |
| 5,867,223 A | 2/1999 | Schindler et al. | |
| 5,878,135 A | 3/1999 | Blatter et al. | |
| 5,892,900 A | 4/1999 | Ginter et al. | |
| 5,903,723 A | 5/1999 | Beck et al. | |
| 5,905,860 A | 5/1999 | Olsen et al. | |
| 5,909,491 A * | 6/1999 | Luo | 380/270 |
| 5,913,039 A | 6/1999 | Nakamura et al. | |
| 5,933,498 A | 8/1999 | Schneck et al. | |
| 5,983,227 A | 11/1999 | Nazem et al. | |
| 6,014,558 A * | 1/2000 | Thomas | 455/410 |
| 6,016,348 A | 1/2000 | Blatter et al. | |
| 6,029,046 A | 2/2000 | Khan et al. | |
| 6,032,200 A | 2/2000 | Lin | |
| 6,038,601 A | 3/2000 | Lambert et al. | |
| 6,044,157 A | 3/2000 | Uesaka et al. | |
| 6,049,821 A | 4/2000 | Theriault et al. | |
| 6,052,720 A | 4/2000 | Traversat et al. | |
| 6,085,193 A | 7/2000 | Malkin et al. | |
| 6,141,756 A | 10/2000 | Bright et al. | |
| 6,148,340 A | 11/2000 | Bittinger et al. | |
| 6,157,721 A | 12/2000 | Shear et al. | |
| 6,167,441 A | 12/2000 | Himmel | |
| 6,185,625 B1 | 2/2001 | Tso et al. | |
| 6,195,433 B1 | 2/2001 | Vanstone et al. | |
| 6,205,475 B1 | 3/2001 | Pitts | |
| 6,212,657 B1 | 4/2001 | Wang et al. | |
| 6,219,680 B1 | 4/2001 | Bernardo et al. | |
| 6,219,708 B1 | 4/2001 | Martenson | |
| 6,226,618 B1 | 5/2001 | Downs et al. | |
| 6,243,719 B1 | 6/2001 | Ikuta et al. | |
| 6,256,637 B1 | 7/2001 | Venkatesh et al. | |
| 6,259,471 B1 | 7/2001 | Peters et al. | |
| 6,278,782 B1 | 8/2001 | Ober et al. | |
| 6,289,452 B1 | 9/2001 | Arnold et al. | |
| 6,292,899 B1 | 9/2001 | McBride | |
| 6,310,956 B1 | 10/2001 | Morito et al. | |
| 6,321,209 B1 | 11/2001 | Pasquali | |
| 6,330,566 B1 | 12/2001 | Durham | |
| 6,338,050 B1 | 1/2002 | Conklin et al. | |
| 6,371,854 B1 | 4/2002 | Ikeda et al. | |
| 6,377,972 B1 | 4/2002 | Guo et al. | |
| 6,389,460 B1 | 5/2002 | Stewart et al. | |
| 6,389,538 B1 | 5/2002 | Gruse et al. | |
| 6,397,186 B1 | 5/2002 | Bush et al. | |
| 6,412,008 B1 | 6/2002 | Fields et al. | |
| 6,427,238 B1 | 7/2002 | Goodman et al. | |
| 6,442,691 B1 | 8/2002 | Blandford | |
| 6,446,113 B1 | 9/2002 | Ozzie et al. | |
| 6,466,048 B1 | 10/2002 | Goodman | |
| 6,480,883 B1 | 11/2002 | Tsutsumitake | |
| 6,500,070 B1 | 12/2002 | Tomizawa et al. | |
| 6,510,502 B1 | 1/2003 | Shimizu | |
| 6,526,581 B1 | 2/2003 | Edson | |
| 6,544,126 B2 | 4/2003 | Sawano et al. | |
| 6,557,104 B2 | 4/2003 | Vu et al. | |
| 6,571,279 B1 | 5/2003 | Herz et al. | |
| 6,574,605 B1 | 6/2003 | Sanders et al. | |
| 6,594,682 B2 | 7/2003 | Peterson et al. | |
| 6,606,644 B1 | 8/2003 | Ford et al. | |
| 6,637,029 B1 | 10/2003 | Eilat et al. | |
| 6,654,388 B1 | 11/2003 | Lexenberg et al. | |
| 6,669,096 B1 | 12/2003 | Saphar et al. | |
| 6,675,350 B1 | 1/2004 | Abrams et al. | |
| 6,691,312 B1 | 2/2004 | Sen et al. | |
| 6,697,948 B1 | 2/2004 | Rabin et al. | |
| 6,704,797 B1 | 3/2004 | Fields et al. | |
| 6,751,729 B1 | 6/2004 | Giniger et al. | |
| 6,760,324 B1 | 7/2004 | Scott et al. | |
| 6,785,712 B1 | 8/2004 | Hogan et al. | |
| 6,805,629 B1 | 10/2004 | Weiss | |
| 6,811,486 B1 | 11/2004 | Luciano, Jr. | |
| 6,826,593 B1 | 11/2004 | Acharya et al. | |
| 6,832,241 B2 | 12/2004 | Tracton et al. | |
| 6,859,535 B1 * | 2/2005 | Tatebayashi et al. | 380/201 |
| 6,873,975 B1 | 3/2005 | Hatakeyama et al. | |
| 6,901,386 B1 | 5/2005 | Dedrick et al. | |
| 6,920,567 B1 | 7/2005 | Doherty et al. | |
| 6,928,551 B1 | 8/2005 | Lee et al. | |
| 6,938,021 B2 * | 8/2005 | Shear et al. | 705/67 |
| 6,948,070 B1 * | 9/2005 | Ginter et al. | 713/193 |
| 6,993,557 B1 | 1/2006 | Yen | |
| 7,020,480 B2 * | 3/2006 | Coskun et al. | 455/466 |
| 7,024,394 B1 | 4/2006 | Ashour et al. | |
| 7,039,708 B1 * | 5/2006 | Knobl et al. | 709/227 |
| 7,051,212 B2 * | 5/2006 | Ginter et al. | 713/193 |
| 7,062,500 B1 * | 6/2006 | Hall et al. | 1/1 |
| 7,069,451 B1 * | 6/2006 | Ginter et al. | 705/51 |
| 7,092,953 B1 | 8/2006 | Haynes | |
| 7,099,479 B1 | 8/2006 | Ishibashi et al. | |
| 7,120,802 B2 * | 10/2006 | Shear et al. | 713/194 |
| 7,124,304 B2 | 10/2006 | Bel et al. | |
| 7,322,042 B2 | 1/2008 | Srinivasan et al. | |
| 7,330,717 B2 | 2/2008 | Gidron et al. | |
| 7,380,275 B2 | 5/2008 | Srinivasan et al. | |
| 7,415,620 B2 | 8/2008 | England et al. | |
| 7,636,843 B1 | 12/2009 | Asano et al. | |
| 7,644,429 B2 | 1/2010 | Bayassi et al. | |
| 2001/0014882 A1 | 8/2001 | Stefik et al. | |
| 2001/0026287 A1 | 10/2001 | Watanabe | |
| 2002/0016818 A1 | 2/2002 | Kirani et al. | |
| 2002/0032784 A1 | 3/2002 | Darago et al. | |
| 2002/0049909 A1 | 4/2002 | Jackson et al. | |
| 2002/0057799 A1 | 5/2002 | Kohno | |
| 2002/0059384 A1 | 5/2002 | Kaars | |
| 2002/0071557 A1 | 6/2002 | Nguyen | |
| 2002/0085720 A1 | 7/2002 | Okada et al. | |
| 2002/0116615 A1 | 8/2002 | Nguyen et al. | |
| 2002/0137566 A1 | 9/2002 | Tomizawa et al. | |
| 2002/0138764 A1 | 9/2002 | Jacobs et al. | |
| 2002/0154799 A1 | 10/2002 | Anderson et al. | |
| 2002/0160833 A1 | 10/2002 | Lloyd et al. | |
| 2002/0161673 A1 | 10/2002 | Lee et al. | |
| 2002/0162115 A1 | 10/2002 | Bruckner et al. | |
| 2002/0165022 A1 | 11/2002 | Hiraoka | |
| 2002/0165028 A1 | 11/2002 | Miyamoto et al. | |
| 2002/0169974 A1 | 11/2002 | McKune | |
| 2002/0184160 A1 | 12/2002 | Tadayon et al. | |
| 2003/0009423 A1 | 1/2003 | Wang et al. | |
| 2003/0023427 A1 | 1/2003 | Cassin et al. | |
| 2003/0023564 A1 | 1/2003 | Padhye et al. | |
| 2003/0028622 A1 | 2/2003 | Inoue et al. | |
| 2003/0045355 A1 * | 3/2003 | Comair | 463/40 |
| 2003/0114227 A1 | 6/2003 | Rubin | |
| 2003/0120541 A1 * | 6/2003 | Siann et al. | 705/14 |
| 2003/0144869 A1 | 7/2003 | Fung et al. | |
| 2003/0157985 A1 | 8/2003 | Shteyn | |

| | | | |
|---|---|---|---|
| 2003/0166398 A1* | 9/2003 | Netanel | 455/410 |
| 2003/0182142 A1 | 9/2003 | Valenzuela et al. | |
| 2003/0220142 A1 | 11/2003 | Siegel | |
| 2004/0015426 A1 | 1/2004 | Tadayon et al. | |
| 2004/0039929 A1 | 2/2004 | Decime | |
| 2004/0044901 A1 | 3/2004 | Serkowski et al. | |
| 2004/0054923 A1 | 3/2004 | Seago et al. | |
| 2004/0083388 A1* | 4/2004 | Nguyen | 713/201 |
| 2004/0098297 A1* | 5/2004 | Borthwick | 705/10 |
| 2004/0098580 A1 | 5/2004 | DeTreville | |
| 2004/0098610 A1* | 5/2004 | Hrastar | 713/200 |
| 2004/0102987 A1 | 5/2004 | Takahashi et al. | |
| 2004/0116119 A1* | 6/2004 | Lewis et al. | 455/435.1 |
| 2005/0004875 A1* | 1/2005 | Kontio et al. | 705/52 |
| 2005/0038753 A1* | 2/2005 | Yen et al. | 705/59 |
| 2005/0071640 A1 | 3/2005 | Sprunk et al. | |
| 2005/0097618 A1 | 5/2005 | Arling et al. | |
| 2005/0122977 A1 | 6/2005 | Lieberman | |
| 2005/0232284 A1 | 10/2005 | Karaoguz et al. | |
| 2006/0026691 A1 | 2/2006 | Kim et al. | |
| 2006/0031222 A1 | 2/2006 | Hannsmann | |
| 2006/0080529 A1 | 4/2006 | Yoon et al. | |
| 2006/0090084 A1 | 4/2006 | Buer | |
| 2006/0129848 A1 | 6/2006 | Paksoy et al. | |
| 2006/0136570 A1 | 6/2006 | Pandya | |
| 2006/0153368 A1 | 7/2006 | Beeson | |
| 2006/0236122 A1 | 10/2006 | Field et al. | |
| 2007/0005504 A1 | 1/2007 | Chen et al. | |
| 2007/0016832 A1 | 1/2007 | Weiss | |
| 2007/0067826 A1 | 3/2007 | Conti | |
| 2007/0150730 A1 | 6/2007 | Conti | |
| 2008/0096608 A1* | 4/2008 | Wendling | 455/558 |
| 2008/0275750 A1* | 11/2008 | Robinson et al. | 705/8 |

FOREIGN PATENT DOCUMENTS

| | | |
|---|---|---|
| EP | 1 091 274 A2 | 4/2001 |
| JP | 2002024178 A1 | 1/2002 |
| WO | WO02/29642 A2 | 4/2002 |
| WO | WO02/30088 A1 | 4/2002 |

OTHER PUBLICATIONS

Aziz, Ashar, et al., "Privacy and Authentication for Wireless Local Area Networks," Sun Microsystems, Inc., (1993).
Davida, George I., et al., "Defending Systems Against Viruses through Cryptographic Authentication," IEEE pp. 312-318 (1989).
Diffie, Whitfield, "The First Ten Years of Public-Key Cryptography," Proceedings of the IEEE, vol. 96, No. 5, pp. 560-577 (May 1988).
Diffie, Whitfield, et al., "New Directions in Cryptography," (1976).
Dyer, Joan G., et al., "Building the IBM 4758 Secure Coprocessor," Computer, pp. 2-12 (Oct. 2001).
Frantzen, Mike, et al., "StackGhost: Hardware Facilitated Stack Protection," Proceedings of the $10^{th}$ USENIX Security Symposium (2001).
Fujimura, Ko., et al., "Digital-Ticket-Controlled Digital Ticket Circulation," Proceedings of the $8^{th}$ USENIX Security Symposium (1999).
Gligor, Virgil D., "20 Years of Operating Systems Security," University of Maryland.
Gutmann, Peter, "The Design of a Cryptographic Security Architecture," Proceedings of the $8^{th}$ USENIX Security Symposium (1999).
Itoi, Naomaru, "SC-CFS: Smartcard Secured Cryptographic File System," Proceedings of the $10^{th}$ USENIX Security Symposium (2001).
Jaeger, Trent, et al., "Building Systems that Flexibly Control Downloaded Executable Context," Proceedings of the $6^{th}$ USENIX UNIX Security Symposium (1996).
Karger, Paul A., "New Methods for Immediate Revocation," IEEE (1989).
Kent, Stephen Thomas, "Protecting Externally Supplied Software in Small Computers," Massachusetts Institute of Technology (1980).

Kogan, Noam, et al., "A Practical Revocation Scheme for Broadcast Encryption Using Smart Cards," Proceedings of the 2003 IEEE Symposium on Security and Privacy (2003).
Lampson, Butler, et al., "Authentication in Distributed Systems" Theory and Practice, Digital Equipment Corporation (1992).
Lotspiech, Jeffrey, et al., "Broadcast Encryption's Bright Future," Computer, pp. 57-63 (Aug. 2002).
Lotspiech, Jeffrey, et al., "Anonymous Trust: Digital Rights Management Using Broadcast Encryption," Proceedings of the IEEE, vol. 92, No. 6, pp. 898-909 (Jun. 2004).
Monrose, et al., "Toward Speech-Generated Cryptographic Keys on Resource Constrained Devices," Proceedings of the $11^{th}$ USENIX Security Symposium (2002).
Neumann, P.G., et al., "A Provably Secure Operating System," Stanford Research Institute (1975).
Palmer, Elaine R., "An Introduction to Citadel—A Secure Crypto Coprocessor for Workstations," IBM Research Division (1992).
Peterson, David S., et al., "A Flexible Containment Mechanism for Executing Untrusted Code," Proceedings of the $11^{th}$ USENIX Security Symposium (2002).
Rubin, Aviel D., "Trusted Distribution of Software Over the Internet," Internet Society 1995 Symposium on Network and Distributed System Security.
Smith, Sean W., "Secure Coprocessing Applications and Research Issues," Los Alamos Unclassified Release LA-UR-96-2805 (1996).
Smith, Sean W., et al., "Building a High-Performance, Programmable Secure Coprocessor," Secure Systems and Smart Cards, IBM T.J. Watson Research Center, NY (1998).
Smith, Sean W., et al., "Using a High-Performance, Programmable Secure Coprocessor," Proceedings of the Second International Conference on Financial Cryptography.
Smith, Sean, et al., "Validating a High-Performance, Programmable Secure Coprocessor," Secure Systems and Smart Cards, IBM T.J. Watson Research Center, NY.
Stefik, Mark, "Trusted Systems," Scientific American, pp. 78-81 (Mar. 1997).
Tygar, J.D., et al.,."Strongbox: A System for Self-Securing Programs," pp. 163-197.
Tygar, J.D. et al., "Dyad: A System for Using Physically Secure Coprocessors," School of Computer Science, Carnegie Mellon University (1991).
Van Doorn, Leendert, "A Secure Java™ Virtual Machine," Proceedings of the $9^{th}$ USENIX Security Symposium (2000).
White, et al., "ABYSS: An Architecture for Software Protection," IEEE Transactions on Software Engineering, vol. 16, No. 6, pp. 619-629(1990).
White, Steve R., et al., "Introduction to the Citadel Architecture: Security in Physically Exposed Environments," IBM Research Division (1991).
Wobber, Edward, et al., "Authentication in the Taso Operating System," Digital Systems Research Center (1993).
Yee, B., et al., "Secure Coprocessors in Electronic Commerce Applications," Proceedings of the First USENIX Workshop on Electronic Commerce (1995).
Yee, B., "Using Secure Coprocessors," PhD Thesis, School of Computer Science, Carnegie Mellon University, Pittsburgh, PA (1994).
Bharadvaj et al., Proceedings of the $17^{th}$ IEEE Symposium on Reliable Distributed Systems, pp. 118-123 (1998).
Hori et al., *Computer Networks*, 33(1-6):197-211 (2000).
Nonnenmacher, Jorg et al., "Asynchronous Multicast Push: AMP." $13^{th}$ International Conference on Computer Commnication, Nov. 18-21, 1997, pp. 419-430, 13, Proceedings of International Conference on Computer Communication, Cannes.
Rodriguez, Pablo et al. Improving the WWW: Caching or Multicast? Computer Networks and ISDN Systems. Nov. 25, 1998, 30(22-23):2223-2243.
Traylor, Scott, "Graphic Resolution and File Sizes", http://www.traylormm.com/harvard/53graphicresolution/.
Wang, Zheng et al. "Prefetching in World Wide Web." Global TeleCommnications Conference, Nov. 18-22, 1996, pp. 28-32, London.

Neboyskey, "A leap Forward: Why States Should Ratify the Uniform Computer Information Transaction Act", May 2000, Federal Communications Law Journal, v52n3, pp. 793-820.

Game Boy, <http://en.wikipedia.org/wiki/Game_Boy_Advanced> Accessed Mar. 30, 2008.

Game Boy Advance, <http://en.wikipedia.org/wiki/Game_Boy_Advanced> Accessed Mar. 30, 2008.

Game Cube, <http://en.wikipedia.org/wiki/Game_Cube> Accessed Mar. 28, 2008.

Dodson, David A, "Gain Some Perspective With Innovation's GBA to TV Converter" Jun. 6, 2002, http://www.viewonline.com/page/articles/innovationsGBATV.htm>, Accessed Mar. 29, 2008.

International Search Report of PCT Application No. PCT/US04/03413, Jun. 22, 2007, 2 pages.

Written Opinion of PCT Application No. PCT/US04/03413, Jun. 22, 2007, 3 pages.

International Search Report of PCT Application No. PCT/US04/37050, Jun. 14, 2005, 1 pages.

Written Opinion of PCT Application No. PCT/US04/37050, Jun. 14, 2005, 3 pages.

International Search Report of PCT Application No. PCT/US2004/040486, May 8, 2007, 1 page.

Written Opinion of PCT Application No. PCT/US2004/040486, May 8, 2007, 8 pages.

International Search Report of PCT Application No. PCT/US2007/010797, Aug. 5, 2008, 1 page.

Written Opinion of PCT Application No. PCT/US2007/010797, Aug. 5, 2008, 3 pages.

International Search Report of PCT Application No. PCT/US2007/010601, Apr. 24, 2008, 1 page.

Written Opinion of PCT Application No. PCT/US2007/010601, Apr. 24, 2008, 4 pages.

International Search Report of PCT Application No. PCT/US07/19862, May 28, 2008, 1 page.

Written Opinion of PCT Application No. PCT/US07/19862, May 28, 2008, 6 pages.

International Search Report of PCT Application No. PCT/US2007/020074, Oct. 8, 2008, 3 pages.

Written Opinion of PCT Application No. PCT/US2007/020074, Oct. 8, 2008, 6 pages.

Co-pending U.S. Appl. No. 10/360,827 filed Feb. 7, 2003.
Co-pending U.S. Appl. No. 11/048,515 filed Jan. 31, 2005.
Co-pending U.S. Appl. No. 10/463,224 filed Jun. 16, 2003.
Co-pending U.S. Appl. No. 10/703,149 filed Nov. 5, 2003.
Co-pending U.S. Appl. No. 11/203,357 filed Aug. 12, 2005.
Co-pending U.S. Appl. No. 11/203,358 filed Aug. 12, 2005.
Co-pending U.S. Appl. No. 12/330,487 filed Dec. 8, 2008.
Co-pending U.S. Appl. No. 11/416,361 filed May 1, 2006.
Co-pending U.S. Appl. No. 12/281,977 filed Jul. 13, 2009.
Co-pending U.S. Appl. No. 11/586,446 filed Oct. 24, 2006.
Co-pending U.S. Appl. No. 12/576,243 filed Oct. 9, 2009.
Co-pending U.S. Appl. No. 11/601,323 filed Nov. 16, 2006.
Co-pending U.S. Appl. No. 12/576,344 filed Oct. 9, 2009.
Co-pending U.S. Appl. No. 12/576,356 filed Oct. 9, 2009.
Co-pending U.S. Appl. No. 12/576,904 filed Oct. 9, 2009.
Co-pending U.S. Appl. No. 12/507,050 filed Jul. 21, 2009.

Notice of Allowance Mailed Aug. 28, 2007 in Co-Pending U.S. Appl. No. 10/360,827 filed Feb. 7, 2003.
Final Office Action Mailed Mar. 8, 2007 in Co-Pending U.S. Appl. No. 10/360,827 filed Feb. 7, 2003.
Non-Final Office Action Mailed Sep. 7, 2006 in Co-Pending U.S. Appl. No. 10/360,827 filed Feb. 7, 2003.
Notice of Allowance Mailed Dec. 20, 2007 in Co-Pending U.S. Appl. No. 11/048,515 filed Jan. 31, 2005.
Non-Final Office Action Mailed Sep. 7, 2007 in Co-Pending U.S. Appl. No. 11/048,515 filed Jan. 31, 2005.
Final Office Action Mailed Mar. 8, 2007 in Co-Pending U.S. Appl. No. 11/048,515 filed Jan. 31, 2005.
Non-Final Office Action Mailed Sep. 7, 2006 in Co-Pending U.S. Appl. No. 11/048,515 filed Jan. 31, 2005.
Advisory Action Mailed Jan. 18, 2008 in Co-pending U.S. Appl. No. 10/703,149 filed Nov. 5, 2003.
Final Office Action Mailed Sep. 10, 2007 in Co-pending U.S. Appl. No. 10/703,149 filed Nov. 5, 2003.
Non-Final Office Action Mailed Mar. 22, 2007 in Co-pending U.S. Appl. No. 10/703,149 filed Nov. 5, 2003.
Final Office Action Mailed May 4, 2006 in Co-pending U.S. Appl. No. 10/703,149 filed Nov. 5, 2003.
Non-Final Office Action Mailed Nov. 2, 2005 in Co-pending U.S. Appl. No. 10/703,149 filed Nov. 5, 2003.
Notice of Allowance Mailed Oct. 3, 2008 in Co-pending U.S. Appl. No. 11/203,357 filed Aug. 12, 2005.
Final Office Action Mailed Oct. 31, 2007 in Co-pending U.S. Appl. No. 11/203,357 filed Aug. 12, 2005.
Non-Final Office Action Mailed May 8, 2007 in Co-pending U.S. Appl. No. 11/203,357 filed Aug. 12, 2005.
Final Office Action Mailed Dec. 11, 2006 in Co-pending U.S. Appl. No. 11/203,357 filed Aug. 12, 2005.
Non-Final Office Action Mailed Jun. 14, 2006 in Co-pending U.S. Appl. No. 11/203,357 filed Aug. 12, 2005.
Final Office Action Mailed Jun. 18, 2007 in Co-pending U.S. Appl. No. 11/203,358 filed Aug. 12, 2005.
Non-Final Office Action Mailed Dec. 14, 2006 in Co-pending U.S. Appl. No. 11/203,358 filed Aug. 12, 2005.
Non-Final Office Action Mailed May 18, 2006 in Co-pending U.S. Appl. No. 11/203,358 filed Aug. 12, 2005.
Non-Final Office Action Mailed Apr. 1, 2010 in Co-pending U.S. Appl. No. 12/330,487 filed Dec. 8, 2008.
Non-Final Office Action Mailed Mar. 13, 2009 in Co-pending U.S. Appl. No. 11/416,361 filed May 1, 2006.
Notice of Allowance Mailed Jul. 24, 2009 in Co-pending U.S. Appl. No. 11/586,446 filed Oct. 24, 2006.
Final Office Action Mailed Jan. 12, 2009 in Co-pending U.S. Appl. No. 11/586,446 filed Oct. 24, 2006.
Non-Final Office Action Mailed May 21, 2008 in Co-pending U.S. Appl. No. 11/586,446 filed Oct. 24, 2006.
Notice of Allowance Mailed Aug. 13, 2009 in Co-pending U.S. Appl. No. 11/601,323 filed Nov. 16, 2006.
Final Office Action Mailed Apr. 30, 2009 in Co-pending U.S. Appl. No. 11/601,323 filed Nov. 16, 2006.
Non-Final Office Action Mailed Sep. 12, 2008 in Co-pending U.S. Appl. No. 11/601,323 filed Nov. 16, 2006.
Final Office Action Mailed Apr. 10, 2009 in Co-pending U.S. Appl. No. 10/463,224 filed Jun. 16, 2003.
Non-Final Office Action Mailed Oct. 3, 2008 in Co-pending U.S. Appl. No. 10/463,224 filed Jun. 16, 2003.
Final Office Action Mailed Apr. 28, 2008 in Co-pending U.S. Appl. No. 10/463,224 filed Jun. 16, 2003.
Non-Final Office Action Mailed Apr. 18, 2007 in Co-pending U.S. Appl. No. 10/463,224 filed Jun. 16, 2003.

* cited by examiner

DELIVERY OF LICENSE INFORMATION USING A SHORT MESSAGING SYSTEM PROTOCOL IN A CLOSED CONTENT DISTRIBUTION SYSTEM

BACKGROUND OF THE INVENTION

1. Field of the Invention

The invention relates to out-of-band delivery of license information, such as for example using an SMS (short messaging system) protocol, with the effect of delivering that license information to a destination in a closed content distribution system, using, at least in part, a channel other than that used for content distribution itself. Delivering that license information to a destination in a closed content distribution system, using, at least in part, a channel other than that used for content distribution itself.

2. Related Art

Closed content distribution systems include end-to-end systems, including publishing servers, content distribution servers and playback devices, where the content that is playable on playback devices can be completely controlled through appropriate security techniques, and those security techniques make it relatively difficult for any unauthorized third party to distribute content that would be playable on the playback devices. For one example, not intended to be limiting in any way, security of a closed content distribution system can be maintained using techniques shown in the incorporated disclosure.

One example of a closed content distribution system includes a playback device, such as a game station, such as for example found in an arcade, a user's home, or a similar type of location, using which content can be executed or presented interactively with one or more game players. Content can be distributed to such a playback device using a download connection to a distribution network, or using transport of physical media (such as for example CD-ROMs or DVDs) including the content, possibly encrypted using a symmetric key, or possibly encrypted using an key pair such as in a public key cryptosystem. For one example, not intended to be limiting in any way, the playback device might operate alone or in conjunction or cooperation with other devices, such as for example a display monitor or an input controller.

One concern with closed content distribution systems is how information is distributed from authorized sources to those playback devices, how those playback devices determine if license rights associated with the user permit that user to execute or present that content, and how those playback devices enforce those license rights while executing or presenting that content. For one example, not intended to be limiting in any way, the closed content distribution system can include reception by the playback device of (1) content to be executed or presented, and of (2) licenses indicating scope of rights by users to execute or present that content. Some examples of closed distribution of content and of licenses are shown in the incorporated disclosure.

One problem is that requirements of channels for distribution of content and licenses can differ significantly, including the amount of information for distribution, the frequency or timing of those distributions, and the degree of time latency tolerable for those distributions. It might be common to distribute several gigabytes of information for content, using one or more DVDs once per week, and to accept a time latency of several days for that distribution. In contrast, it might be common to distribute at most several kilobytes of information for licenses, but it might be advantageous to receive that license information within minutes of a request, such as for example in response to the user presenting proof of payment for the license.

For one example, not intended to be limiting in any way, it might be advantageous to allocate a function of delivering content to a content server, and separately to allocate a function of delivering licenses to a license server, such as for example shown in the incorporated disclosure. One problem is that contact with such a license server involves relatively more frequent requests for relatively smaller amounts of information, and should provide for relatively quick response and relatively little time latency. In contrast, contact with such a content server involves relatively less frequent requests for larger amounts of information, and can tolerate relatively slower response and relatively larger time latency. In one embodiment, the license enables the content to be determined to be executable, valid, or both, with the effect that the content might be received at the player device any time in advance of the license.

If content is to be delivered to the playback device using physical media, distribution does not need to involve any coupling to a communication network or other form of electronic distribution. However, if licenses are to be delivered to the playback device, coupling to a communication network or other form of electronic distribution can involve significant expense, particularly when the playback device is itself relatively inexpensive. Also, this would involve network connectivity or other connectivity being available at the consumer end (that is, the playback device itself), when communicating with the license server. Accordingly, it would be advantageous to provide a technique for delivering licenses relatively quickly and with relatively little time latency, without involving the expense of coupling the playback device to a communication network or other form of electronic distribution.

Accordingly, it would be advantageous to provide a technique involving delivery of license information or a shorter code from which license information might be derived or verified, not subject to drawbacks of known systems, such as for example in a closed distribution system.

SUMMARY OF THE INVENTION

The invention provides a method and system capable of delivery of license information, such as for example in a closed distribution system. In one embodiment, a closed distribution system includes a playback device including a computing device capable of general purpose processing, and capable of enforcing mandatory execution of selected security software, such as for example a secure processor such as described in the incorporated disclosure. The playback device is capable of receiving content to be executed or presented, such as for example embedded on physical media delivered to a location at or near the playback device. Operation of the secure processor assures that only authorized content is executed or presented by the playback device, and any appropriate licensing or rights information is interpreted and enforced by the playback device. In one embodiment, the secure processor has access to external memory on which that secure processor can maintain rewritable information, such as for example game state information, license information, and user information, authenticated or hidden using a cryptographically-secure technique, such as for example digital encryption or digital signature.

For one example, not intended to be limiting in any way, the playback device might be coupled to a LAN (local area network) or a secured enterprise network, with the effect that content delivered to devices coupled to one of those networks can be available to the playback device. This includes the effect that the playback device would be able to include additional communication links to supplemental input controllers, with the effect that the method and system can support multiplayer games and games with multiple input controllers, and with the effects that games can include contests among multiple players for "high score" and the like, and can also include associations of players, such as for example player teams.

In one embodiment, a user (such as a game-player) associated with a playback device makes a connection to a license server, to request a license to selected content. The connection includes a communication link outside the closed content system, and provides the user with a technique for communicating with the license server, without involving the playback device in that connection. For one example, not intended to be limiting in any way, the user might request a license using SMS (short messaging system) or another technique with the effect of sending a relatively small amount of information to request a license for specific content (whether application program, media content, or otherwise). The license server receives the request, determines if a license should be issued, and responds to the request. For one example, not intended to be limiting in any way, the license server might respond to the request using SMS, with the effect of providing the user with an alphanumeric or numeric code. This has the effect of allowing the user to input that alphanumeric or numeric code to the playback device, which can determine if that alphanumeric or numeric code authorizes the user for the selected content.

In one embodiment, the alphanumeric or numeric code might represent information typically included in a license message as described in the incorporated disclosure. For one example, not intended to be limiting in any way, the alphanumeric or numeric code might include a hexadecimal (or other radix) representation of a license message. The playback device might receive that alphanumeric or numeric code from the user using a keypad or other input device.

In one embodiment, the playback device, using its secure processor, can authenticate the license message, with the effect of determining whether the user is authorized to execute or present the selected content. For one example, not intended to be limiting in any way, the license message might be encoded using a digital signature or a secure hash, with the effect that the playback device (or the secure processor) can determine if that license message is authentic. If that license message is in fact authentic, the playback device (or the secure processor) can determine if that license message grants the user sufficient rights to execute or present the selected content, and can control whether that selected content is executed or presented.

For a first example, not intended to be limiting in any way, the alphanumeric or numeric code might include a representation of a content decryption key, using which the playback device might be able to decrypt content and access that content for execution or presentation. In one embodiment, content encryption and decryption includes a public-key cryptosystem, with the effect that the content decryption key would include a decryption key privately associated with the content, encrypted by an encryption key publicly associated with the specific playback device. This would have the effect that the alphanumeric or numeric code would only allow the playback device to execute or present the content if the selected content and the specific playback device were both associated with the information received from the license server.

For a second example, not intended to be limiting in any way, an activation code might include an identity of the player and an identity of the content itself, either signed by the license server, or encrypted by a common key (such as for example a Diffie-Hellman shared secret) that can be computed by both the license server and the specific player. The mandatory security software would, in such cases, enforce the computation of the secret key (using its private key and server public key) and decryption of the identities. In alternative embodiments, the mandatory security software may enforce the verification of a signature by the license server. In such cases, the mandatory security software would force the comparison of the player identity with its own tamper-proof identity and the identity of the content that the activation code is meant for. In such cases, the mandatory security software would separately authenticate the content identity with respect to the content data hash or signature, using a trusted server (such as for example a trusted content publisher) signature over those quantities.

In one embodiment, communication between the license server and the user involves a commercial transaction. For one example, not intended to be limiting in any way, the license server would receive information from the user sufficient to allow the license server to effect a purchase transaction by the user (such as for example, a credit card or debit card number the user is authorized to charge, an account or a subscription the user is authorized to use, and the like). In such embodiments, the license server would issue the alphanumeric or numeric code in response to the user having sufficient authorization to use the playback device; that sufficient authorization would include proof that the user had (either in the past or just then) purchased the right to use the content with that playback device.

After reading this application, those skilled in the art would recognize that the techniques described herein provide an enabling technology, with the effect that heretofore advantageous features can be provided that heretofore were substantially infeasible.

INCORPORATED DISCLOSURE

Figure 1:
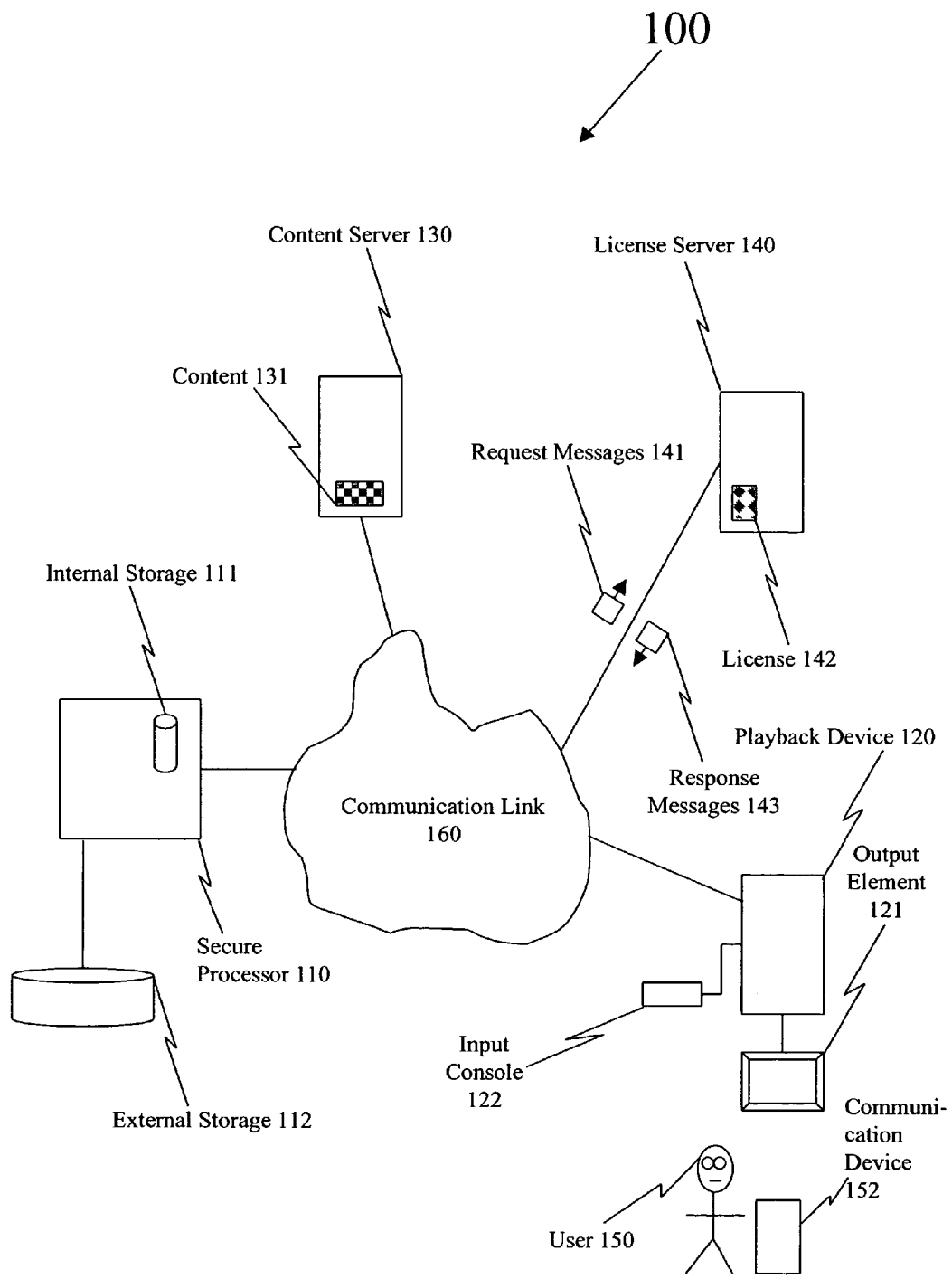
FIG. 1 shows a block diagram of a system including a closed distribution system and a separate connection capable of delivery of license information.

This application claims priority of the following documents, each of which is hereby incorporated by reference as if fully set forth herein.

U.S. patent application Ser. No. 10/360,827, filed Feb. 7, 2003 in the name of inventors Pramila SRINIVASAN, John PRINCEN, Frank BRENDT, David BLYTHE, William SAPERSTEIN, and Wei YEN, titled "Secure and Backward-Compatible Processor and Secure Software Execution Thereon," and all applications claiming priority thereof.

U.S. patent application Ser. No. 10/703,149, filed Nov. 5, 2003 in the name of inventors Wei YEN and David BLYTHE, titled "Static-or-Dynamic and Limited-or-Unlimited Content Rights," and all applications claiming priority thereof.

These documents are each hereby incorporated by reference as if fully set forth herein, and are sometimes collectively referred to herein as the "incorporated disclosure".

Inventions described herein can be used in combination or conjunction with technology described in the incorporated disclosure.

DETAILED DESCRIPTION OF THE PREFERRED EMBODIMENT

Preferred embodiments of the invention are described herein, including preferred device coupling, device functionality, and process steps. After reading this application, those skilled in the art would realize that embodiments of the invention might be implemented using a variety of other techniques not specifically described herein, without undue experimentation or further invention, and that such other techniques would be within the scope and spirit of the invention.

Lexicography

The following terms refer or relate to aspects of the invention or its embodiments. The general meaning of each of these terms is intended to be illustrative and in no way limiting.

The phrase "closed distribution system" generally describes a system in which content can be delivered from an authorized source, and in which recipients of that content can assure that the specific content is authorized to be executed or presented in the closed distribution system. The concept of a closed distribution system is broad, and includes any system in which distribution, execution, or presentation of content can be restricted to specific authorized content. In one embodiment, the closed distribution system can be used in combination or conjunction with business techniques in which content can be licensed or paid for by those users who wish to execute or present that content.

The term "content" or the phrase "content element" generally describe an application program (such as for example a game program) or a set of media content (such as for example an animation clip or a video clip) to be executed or interpreted (for code or instructions) or to be displayed or presented (for media content). As described below, the content might include application software, audio/video presentations, databases, games, multimedia content, reasonable combinations or generations thereof, and the like. The concept of content is broad, and might include application programs, games, audio or video, and the like. In one embodiment, each content item is associated with a unique identity, with the effect that licenses can refer to that specific content item.

The phrase "secure processor" generally describes any device that can use information from a rewritable storage element, and can operate as a relatively secure computing device performing the functions of a controller for a game system or similar system. As described below, the secure processor is relatively secure against tampering, and includes at least a UID (unique identifier) or a known encryption key (such as for example a key private key of a private-public key pair in a public-key cryptosystem), with the effect that other elements of the system are capable of communicating privately and securely with the secure processor. The concept of a secure processor is broad, and includes any general purpose or special purpose computing device for which there is at least some secure memory, secured against inspection or intrusion from outside the secure processor, and for which there is at least some executive control capable of preventing application software from disclosing the contents of that secure memory. In one embodiment, the secure processor has at least some built-in security software that cannot readily be circumvented or other techniques to securely bootstrap the loading of such security software from insecure devices, such as for example external mass storage.

The phrase "playback device" generally describes any device that can execute or present selected content, such as for example in conjunction with, in cooperation with, or under control of a relatively secure computing device, such as possibly a secure processor as described above. As described below, this has the effect that the playback device is relatively secure against tampering, with the effect that only authorized users can execute or present content using the playback device. The concept of a playback device is broad, and includes any general purpose or special purpose computing device capable of executing instructions or presenting human-readable media (such as for example audio or visual media). In one embodiment, the playback device has at least some built-in security software that cannot readily be circumvented. In one embodiment, (1) each playback device is associated with a unique identity, with the effect that licenses can refer to that specific playback device, and (2) each playback device is associated with a public/private key pair in a public key cryptosystem, with the effect that other devices can communicate securely with that playback device.

The term "license" generally describes information sufficient for the secure player to verify the authenticity of the content and to use the content, and to verify that the specific user has rights to execute or present the content at the specific playback device. In one embodiment, each license includes a data structure associated with one or more content elements, and including, in one embodiment, (1) a key for that content, such as for example encrypted by an encryption key publicly associated with the user or including a shared secret known to the user, with the effect that the secure processor can access the content if it has access to the license, (2) a digital signature or secure hash value, with the effect that the license cannot be easily altered and remain effective, and (3) a digital signature or secure hash value associated with the content itself, with the effect that the license can be verified by the playback device to be associated with the specific content. As described below, the license also includes a description of those rights the licensee has with regard to the content. In one embodiment, licenses are individually tailored to each authorized recipient or user, although in the context of the invention there is no such particular requirement.

The phrase "activation code" describes a part of a whole license, considered necessary and sufficient to permit execution of selected specific content by the specific player device. An activation code might be an entire license, a part thereof, or a transformation thereof (such as a transformation suitable for human reading or data entry).

The phrase "license server" generally describes, in the distribution system, any device capable of delivering licenses or activation codes granting rights to content. In one embodiment the license server includes an online transaction server capable of requesting an identity of the device requesting the license and capable of creating, in response, a cryptographically signed data structure containing information specifying a content item identity, a playback device identity and a set of rights to that content.

The term "rights" and the phrases "content rights" or "rights to the content" generally describe what actions the secure processor and the playback device re allowed to take with regard to the content. For some examples, not intended to be limiting in any way, the rights might include a number of times the secure processor or the playback device are allowed to execute the content, an amount of total running time the secure processor or the playback device are allowed to execute the content, an amount of wall-clock time the secure processor or the playback device are allowed to execute the content, what resources (such as for example what hardware or what software) the secure processor or the playback device can utilize during execution or presentation of the content, and the like. As described below, the secure processor prevents any use of the content outside those specified by the content rights.

The phrases "content server" or "content distribution server" generally describe, in the distribution system, any device capable of delivering content (either directly or indirectly), to a secure player or secure processor, using any form of transport technique. As described below, the content distribution server needs only a single copy of each content element, and might deliver multiple individualized copies of that content element in response to distinct users or in response to distinct requests. The concept of a content server is broad, and includes not only a server having content stored thereon, but also devices by which content might be dynamically created, such as a television camera, video camera, web-cam, any reasonable generalization thereof, and the like. The content server may include a secure device capable of generating a secure hash and securely signing any information distributed from the server.

The phrase "input console" generally describes any device capable of delivering control inputs, either directly or indirectly, from a user to a playback device or a controller thereof. The concept of an input console is broad, and includes any manner of user input device, possibility including a keyboard or keypad, joystick or mouse or other pointing device, or other control buttons, whether pre-selected or dynamically presented using a flat-panel controller, and the like. For example, the input console might include a direct wire connection, a direct RF or IR connection, or an indirect (switched) connection.

The term "rewritable storage element" generally describes any device capable of maintaining information for use by a secure processor or playback device, and capable of being rewritten with new information. As described below, a rewritable storage element might include a flash memory. The concept of a rewritable storage element is broad, and includes any manner of storage device capable of being read and written, whether random access or not, and whether the read or write operations are relatively rapid or not. For some examples, not intended to be limiting in any way, the rewritable storage element might include an SRAM, flash memory, bubble memory, or disk drive (magnetic or optical or both).

The scope and spirit of the invention is not limited to any of these definitions, or to specific examples mentioned therein, but is intended to include the most general concepts embodied by these and other terms.

System Elements

FIG. 1 shows a block diagram of a system including a closed distribution system and a separate connection capable of delivery of license information.

A system 100 includes a secure processor 110, a playback device 120, a content server 130, a license server 140, and a communication link 160 between the license server 140 and a user 150.

As further described in the incorporated disclosure, the secure processor 110 includes a secure state and its monitored state, with an application program (such as a game program) running in the monitored state. In one embodiment, the application program is responsive to a set of content 131, suitable for execution or presentation. The secure processor 110 might perform the content 131 in the monitored state, where that content 131 is suitable for execution, or might control the playback device 120 to present the content 131, where that content 131 is suitable for presentation.

In one embodiment, the secure processor 110 includes at least some internal storage 111, suitable for maintaining data secure against discovery or tampering, and is associated with a unique identifier and with a public/private key pair in a public key cryptosystem. The secure processor 110 also includes at least some external storage 112, such as for example flash memory or one or more disk drives, on which the secure processor 110 might maintain additional information (such as information not readily capable of being maintained in the internal storage 111). In one embodiment, the additional information maintained on the external storage 112 can be protected against discovery by digital encryption and can be protected against tampering using a digital signature or a secure hash code.

As further described in the incorporated disclosure, the playback device 120 includes an output element 121 capable of presenting the content 131, and includes at least one input console 122 capable of receiving commands, control inputs, or other inputs from one or more users 150. In one embodiment, the playback device 120 is capable of receiving control inputs from the input console 122, such as for example a set of license information 141 received from the license server 140.

In one embodiment, the secure processor 110 and the playback device 120 are effectively coupled, with the effect that the secure processor 110 can execute the content 131, or can control the playback device 120 to present the content 131. For a first example, not intended to be limiting in any way, the playback device 120 might include a computer game station operating under control of an embedded secure processor 110 (and possibly other processors). For a second example, not intended to be limiting in any way, the playback device 120 might include audio, video, or audio-video presentation hardware, capable of presenting sound and pictures to the user 150 in response to control of an embedded secure processor 110 (and possibly other processors).

In one embodiment, content 131 or license information 141 received by the secure processor 110 or the playback device 120 might be maintained on the external storage 112, digitally encrypted against discovery and digitally signed against tampering using a public/private key pair in a public key cryptosystem, the public/private key pair being maintained in the internal storage 111.

As further described in the incorporated disclosure, the content server 130 includes a set of content 131 suitable for execution or presentation. The content 131 can be distributed to the secure processor 110 or the playback device 120, using an electronic form of delivery (such as for example a broadcast technique or a computer network), a physical form of delivery (such as for example transport of physical media on which the content 131 is embedded in an encoded format), or some other form of distribution by which the secure processor 110 or the playback device 120 receives the content 131 in a relatively economical manner.

As further described in the incorporated disclosure, the license server 140 includes a processor, program and data memory, capable of receiving request messages 141 for one or more of a set of licenses 142, capable of generating or retrieving licenses 142, and capable of sending response messages 143 including information relating to those licenses 142.

Although it is possible for the secure processor 110 or the playback device 120 to communicate directly with the license server 140, in one embodiment, the secure processor 110 and the playback device 120 need not have any connection to the communication link 160. In such embodiments, the user 150 obtains information, if such information is necessary to request a license 142, from the secure processor 110 or the playback device 120. The user 150 generates a request message 141 including information necessary to request the license 142, and sends that request message 141 to the license server 140, without the assistance of either the secure processor 110 or the playback device 120.

In one embodiment, the user 150 reads a first alphanumeric or numeric code 151 from the output element 121 of the playback device 120, including information sufficient to generate a request message 141 that can be sent to the license server 140. For a first example, not intended to be limiting in any way, the first alphanumeric or numeric code 151 might include a hexadecimal representation of the request message 141. For a second example, not intended to be limiting in any way, the first alphanumeric or numeric code 151 might include instructions to the user 150 to read the information sufficient to generate a request message 141 from another source, such as for example a first unique identifier imprinted on the playback device 120 and a second unique identifier imprinted on physical media (such as for example a CD or DVD) on which the content 131 is embedded.

In one embodiment, the user 150 uses a communication device 152, such as for example a cellular telephone, a "Palm Pilot" or PDA or other hand-held computer, or a hybrid thereof, capable of communication using the SMS (short message service) protocol, to send the request message 141 to the license server 140. In such embodiments, the communication link 160 between the license server 140 and the user 150 includes a private or public switched telephone network including cellular telephony. However, as described below, other and further examples of communication between the license server 140 and the user 150 are within the scope and spirit of the invention, with the effect that the communication link 160 might include one of a wide variety of techniques for transporting information from the user 150 to the license server 140, and back from the license server 140 in response thereto.

The SMS protocol is a relatively low data rate protocol using GSM wireless networks. SMS is supported by many makes and models of cellular telephones, hand-held computers, and similar devices. The license server 140 receives the request message 141, generates a license 142 (in response to information recoverable from that request message 141), and sends a response message 143 (including information sufficient to recover the license 142) to the user 150. In one embodiment, the user 150 receives the response message 143 at the same communication device 152, but in the context of the invention, this is not a requirement.

In one embodiment, the user 150 reads the response message 143 from the communication device 152 (SMS is a text-based protocol, so the response message 143 should be readable by a human user 150). The user 150 enters at least some information from the response message 143 into the input console 122, with the effect that the secure processor 110 and the playback device 120 are able to receive that information without having any direct communication link to the license server 140.

After reading this application, other and further examples of communication between the license server 140 and the user 150 would be clear to those skilled in the art. After reading this application, those skilled in the art would recognize that such other and further examples would be workable in response to information from this application and its incorporated disclosure, are within the scope and spirit of the invention, and would not require undue experiment or further invention. Such other and further examples include:

Examples of immediate payment: credit or debit cards, pre-paid phone cards, scratch-off phone cards, telephone billing using 900 or 976 phone numbers, vending devices taking deposits of actual bills, coins, or tokens.

Examples of non-immediate payment: account numbers with credits or debits, subscription accounts. Any of these could use either cash or game credits.

Examples of other types of communication to request licenses: Palm Pilot communication using digital ink or handwriting recognition, Palm Pilot communication using stylus gestures, telephone calls using touch tone and AVR (automated voice response), telephone calls using voice recognition.

Examples of other types of communication to respond with license information: a broadcast or cablecast message direct to the secure processor or the playback device, or a web server returning an activation code in response to appropriate input request, such as possibly using a hypertext protocol.

Examples of other types of recognition of the playback device: Bluetooth recognition of the playback device from the cellular telephone, GPS location of the user.

In one embodiment, the secure processor 110 and the playback device 120 are coupled to a LAN (local area network) or a secure enterprise network, with the effect that the secure processor 110 and the playback device 120 can communicate with other such secure processors 110 or playback devices 120 without any requirement for a communication link 160 capable of relatively remote communication.

Method of Operation

Figure 2:
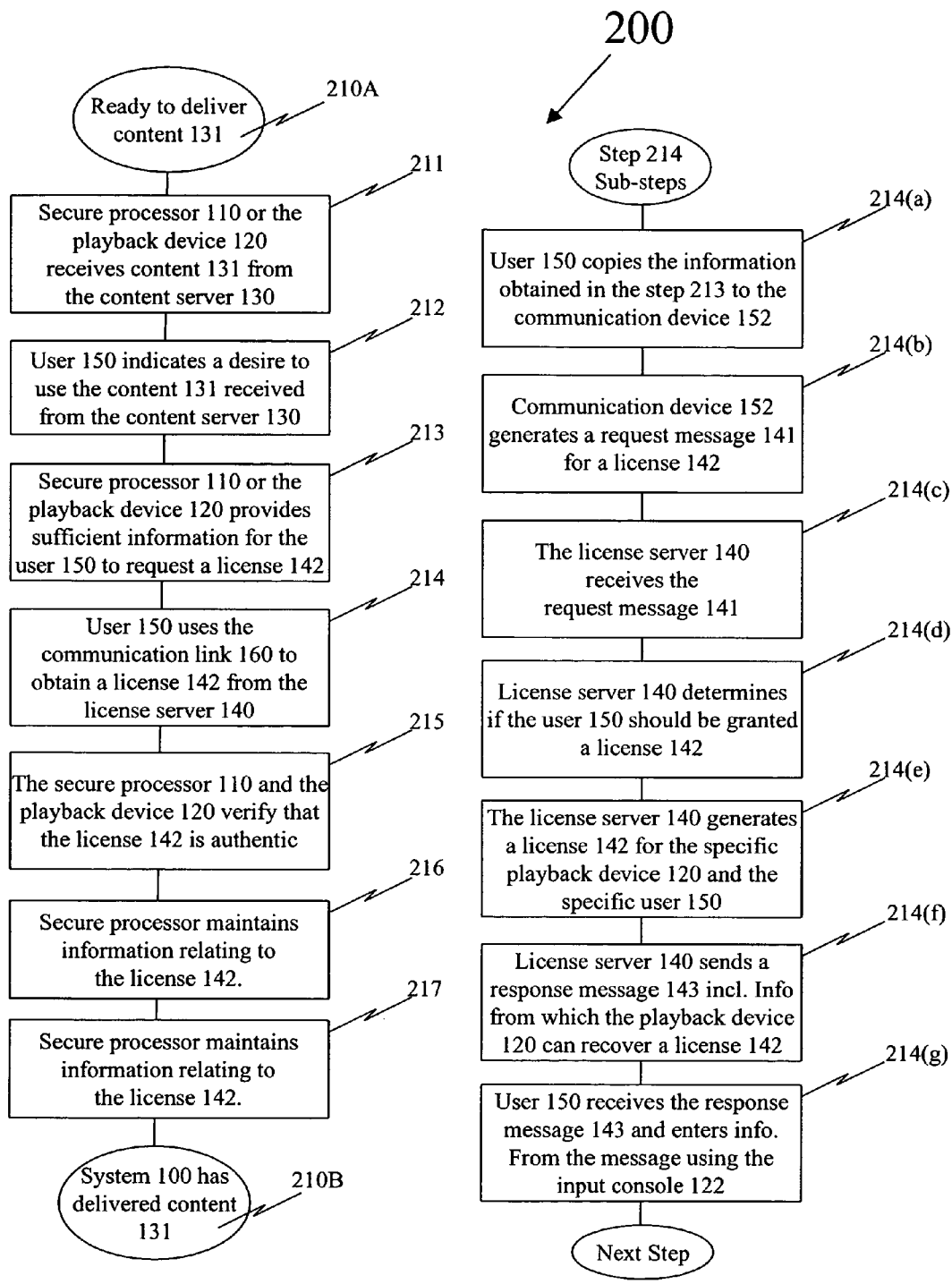
FIG. 2 shows a process flow diagram of a method of using a system including a closed distribution system and a separate connection capable of delivery of license information.

FIG. 2 shows a process flow diagram of a method of using a system including a closed distribution system and a separate connection capable of delivery of license information or activation code.

Although described serially, the flow points and steps of the method 200 can be performed by separate elements in conjunction or in parallel, whether asynchronously or synchronously, in a pipelined manner, or otherwise. In the context of the invention, there is no particular requirement that the method 200 must be performed in the same order in which this description lists flow points or steps, except where explicitly so indicated.

At a flow point 210A, the system 100 is ready to deliver content 131 to the secure processor 110 or playback device 120, and to make that content 131 available to the user 150 for execution by the secure processor 110 or presentation by the playback device 120.

At a step 211, the secure processor 110 or the playback device 120 receives content 131 from the content server 130.

At a step 212, the user 150 indicates a desire to use the content 131 received from the content server 130.

At a step 213, either the secure processor 110 or the playback device 120 provides sufficient information for the user 150 to request a license 142 from the license server 140.

At a step 214, the user 150 uses the communication link 160 to obtain a license 142 from the license server 140. As part of this step, the user performs the following sub-steps:

At a sub-step 214(a), the user 150 copies the information obtained above in the step 213 to the communication device 152.

At a sub-step 214(b), the communication device 152 generates a request message 141 for a license 142. In one embodiment, the request message 141 includes a proof of payment by the user 150 for the license 142, such as an account number to charge or verify, a credit or debit card number to charge, a code derived from a scratch-off card, and the like, as described above with regard to FIG. 1.

At a sub-step 214(c), the license server 140 receives the request message 141.

At a sub-step 214(d), the license server 140 determines if the user 150 should be granted a license 142. If not, the license server 140 generates a response message 143 denying the license, and the method 200 returns to the flow point 210A. In one embodiment, as part of determining if the user 150 should be granted a license 142, the license server 140 authenticates the proof of payment by the user 150 for the license 142.

At a sub-step 214(e), the license server 140 generates a license 142 for the specific playback device 120 and the specific user 150.

At a sub-step 214(f), the license server 140 sends a response message 143 including information from which the playback device 120 can recover the license 142.

At a sub-step 214(g), the user 150 receives the response message 143 and enters information from that message using the input console 122.

At a step 215, the secure processor 110 and the playback device 120 verify that the license 142 is authentic, and that the license 142 grants rights for the specific user 150 to use the specific content 131 with the specific playback device 120.

At a step 216, the secure processor 110 maintains information relating to the license 142, including the rights granted to the specific user 150, in secure storage (either the internal storage 111 or, subject to digital encryption and digital signature, the external storage 112).

At a step 217, the secure processor 110 and the playback device 120 execute or present the content 131, subject to the rights granted by the license 142. In one embodiment, execution or presentation might be interactive with the user 150.

At a flow point 210B, the system 100 has delivered content 131 to the secure processor 110 or playback device 120, and made that content 131 available to the user 150 for execution by the secure processor 110 or presentation by the playback device 120, and is now ready to perform another task.

Alternative Embodiments

Although preferred embodiments are disclosed herein, many variations are possible which remain within the concept, scope, and spirit of the invention. These variations would become clear to those skilled in the art after perusal of this application.

A license requesting device could automatically make the request with its embedded ID. This might be the playback device itself.

The content ID might be implicitly assumed, since there is only one application for which rights are purchased.

The rights might be in terms of duration of execution or number of times of execution (for example, MP3 sound recordings), with licenses being generic or specific to a particular content identifier.

The method of authentication or verification of the license might include the following: The license server might deliver a content key for the specific encrypted content, in turn encrypted by a shared secret key known only to the specific player. This ensures that only the intended recipient is able to play the content.

The method of authentication or verification of the license might include the following: The license server might deliver a signature over a token including the player and content identities. The security software is able to enforce the check against its own identity and the content identity. In lieu of the signature, the server could (either in addition or instead) encrypt the token using a shared key known only to the intended recipient.

After reading this application, those skilled in the art would recognize that the techniques described herein provide an enabling technology, with the effect that heretofore advantageous features can be provided that heretofore were substantially infeasible. After reading this application, those skilled in the art will recognize that these alternative embodiments and variations are illustrative and are intended to be in no way limiting.

The invention claimed is:

1. A method comprising:

generating by a license server a text-based activation code based on information obtained from a playback device;

in a closed content distribution system including the playback device and a secure processor that is coupled to the playback device such that the secure processor can enable execution or presentation of content on the playback device, receiving an SMS text message that includes license information in the form of the text-based activation code via a communication link not including the playback device or secure processor, wherein, in operation, at least part of the SMS message is communicated to the playback device by a human who receives the SMS message and enters the text-based activation code in an input console coupled to the playback device;

constructing, at the playback device, license parameters including a device ID, a content ID, and a rights code identified by the text-based activation code, wherein the playback device or the secure processor, or both in combination or conjunction, are associated with the device ID;

using at least part of the SMS text message as a signature to authenticate the constructed license parameters, wherein at least part of the text-based activation code is used as the cryptographic signature generated using a private key of a public key cryptographic key pair;

allowing content identified by the content ID to be executed or presented by the playback device or the secure processor, or by both in combination or conjunction in accordance with verification of the constructed and authenticated license parameters, wherein the verification is performed by execution of a mandatory security software by the secure processor, including;

authenticating a specific content element, a specific playback device or secure processor, and a specific user;

comparing the device ID with a tamper-proof identity available to the playback device or the secure processor, or to both in combination or conjunction;

comparing rights information with an identity of selected content available to the playback-device or the secure processor, or to both in combination or conjunction;

computing a secret key using a private key of the secure processor and a public key of the license server;

decrypting the identities using the secret key;

verifying a signature by the license server;

ensuring that use by the specific user of the specific content element with the specific playback device or secure processor, or by both in combination or conjunction, is in accordance with the license information.

2. A method as in claim 1, including steps of ensuring that only authorized content is executed or presented by the playback device or a secure processor, or by both in combination or conjunction.

3. A method as in claim 1, including steps of sending the content to the playback device using a communication link not used by the steps of sending the text-based activation code.

4. A method as in claim 1, wherein the steps of enforcing are performed at least in part by the playback device or a secure processor coupled thereto.

5. A method as in claim 1, wherein the steps of enforcing are performed by mandatory security hardware or mandatory security software.

6. A method as in claim 1, wherein the steps of enforcing include steps of decrypting at least some information derivable from the text-based activation code.

7. A method as in claim 1, wherein the steps of enforcing includes using a key derived from the text-based activation code for decrypting a license or the content.

8. A method as in claim 1, wherein the steps of enforcing includes
putting together at least an identity of the playback device and an identity of the content;
applying at least part of the text-based activation code, the identity of the playback device, and the identity of the content to authenticate the execution rights for the playback device for the content.

9. A method as in claim 1, wherein the steps of enforcing includes applying a key derived from the text-based activation code as an authentication code.

10. A method as in claim 1, wherein the text-based activation code is included in an SMS.

11. A method as in claim 1, wherein at least a portion of the text-based activation code is manually entered into the playback device.

12. A method as in claim 1, wherein at least a portion of the text-based activation code is provided to the playback device, wherein the playback device processes the portion of the text-based activation code and produces a licensing message suitable to be sent by the communication device.

13. A method as in claim 12, wherein the licensing message is encrypted or cryptographically authenticated by the communication device and sent to a license server.

14. A method as in claim 1, wherein the steps of enforcing include steps of using a decryption key available to the playback device or a secure processor coupled thereto.

15. A method as in claim 1, wherein said text-based activation code is included in a first message, further comprising:
sending a second message from the communication device to a license server;
sending the first message from the license server to the communication device, the first message including human-readable characters;
manually entering those characters to an input element coupled to the playback device.

16. A method as in claim 1, wherein the system includes a closed content distribution system capable of delivering content to the playback device using a second transport technique not including that used by the steps of sending a text-based activation code.

17. A method as in claim 1, wherein the system includes a closed content distribution system capable of ensuring that only authorized content is presented by the playback device or executed by a secure processor.

18. A method as in claim 1, including steps of authenticating the rights information by the playback device or a secure processor coupled thereto.

19. A method as in claim 1, further comprising decrypting at least some information derivable from the text-based activation code.

20. A method as in claim 1, further comprising using a decryption key available to the playback device or a secure processor coupled thereto to authenticate the rights information.

21. A method as in claim 1, further comprising:
constructing parameters of execution rights for the handheld device or the content;
providing a system including a playback device;
sending to the playback device, via a transport technique not including the playback device, a text-based message associated with an SMS technique, wherein the text-based message is derivable by the system;
enforcing, using mandatory security hardware or mandatory security software, the rights information on the system in response to the text-based message, said enforcing including:
constructing parameters of execution rights for the playback device;
using at least part of the text-based message as a signature to authenticate the execution rights.

22. A method as in claim 1, wherein the cryptographically verifying includes using at least part of the text-based activation code as a cryptographic signature generated using a private key of a public key cryptographic key pair.

23. A method as in claim 1, wherein the cryptographically verifying includes computing a cryptographic signature using a computed shared secret key to construct a message authentication code (MAC).

24. A method as in claim 1, wherein the cryptographically verifying includes decrypting the text-based activation code using a computed shared secret key and matching the decrypted text-based activation code against the license parameters.

25. A method as in claim 1, wherein one or more of the license parameters are selected from the group consisting of: a device identity, a content identity, and a rights code.

26. A method comprising:
generating by a license server a text-based activation code based on information obtained from a playback device;
providing, in a closed content distribution system, including the playback device and a secure processor, the secure processor effectively coupled to the playback device, with the effect that the secure processor can execute the content or control the playback device to present the content, an SMS text message that includes license information in the form of the text-based activation code, wherein the SMS message is sent via a communication link not including the playback device or secure processor, wherein, in operation, at least part of the SMS message is communicated to the playback device by a human who receives the SMS message and enters the text-based activation code in an input console connected to the playback device;

constructing, at the playback device, license parameters including a device ID, a content ID, and a rights code identified by the text-based activation code, wherein the playback device or the secure processor, or both in combination or conjunction, are associated with the device ID;

using at least part of the SMS text message as a signature to authenticate the constructed license parameters, wherein at least part of the text-based activation code is used as the cryptographic signature generated using a private key of a public key cryptographic key pair;

allowing content identified by the content ID to be executed by the secure processor or presented by the playback, or by both in combination or conjunction in accordance with verification of the constructed and authenticated license parameters, wherein the verification is performed by execution of a mandatory security software by the secure processor, which performs:

authenticating a specific content element, a specific playback device or secure processor, and a specific user;

enforcing comparison of the device ID with a tamper-proof identity available to the playback device or the secure processor, or to both in combination or conjunction;

enforcing comparison of rights information with an identity of selected content available to the playback-device or the secure processor, or to both in combination or conjunction;

enforcing computation of a secret key using a private key of the secure processor and a public key of the license server, and decryption of the identities using the secret key;

enforcing verification of a signature of the license server; and ensuring that the specific user uses the specific content with the specific playback device or the secure processor, or by both in combination or conjunction in accordance with the license information.

27. A method as in claim 26, including steps of authenticating the license information by the playback device or the secure processor, or by both in combination or conjunction.

28. A method as in claim 26, including steps of determining in response to the rights information whether the user is authorized to execute or present the selected content.

29. A method as in claim 26, including steps of encoding the license information using a digital signature, secure hash, or shared secret; and authenticating the license information by the playback device or the secure processor, or by both in combination or conjunction, in response to the digital signature, secure hash, or shared secret.

30. A method as in claim 26, including steps of receiving content at the playback device.

31. A method as in claim 26, wherein at least a portion of the content is included on physical media transported to the playback device or secure processor.

32. A method as in claim 26, wherein at least a portion of the content is present at the playback device or secure processor before the steps of delivering license information.

33. A method as in claim 26, wherein the communication link includes a cellular telephone.

34. A method as in claim 26, wherein the content can be executed or interpreted by the playback device or the secure processor, or by both in combination or conjunction.

35. A method as in claim 26, wherein the content can be presented in a human-sensible form by the playback device or the secure processor, or by both in combination or conjunction.

36. A method as in claim 26, wherein the secure processor includes a computing device capable of enforcing mandatory execution of selected security software.

37. A method as in claim 26, wherein the secure processor includes a 14 computing device capable of general purpose processing.

38. A method as in claim 26, wherein the steps of providing include steps of sending a text-based message to a hand-held device using an SMS technique, the text-based message including information from which rights information is derivable.

39. A method as in claim 26, wherein the steps of ensuring include steps of decoding the license information;

generating at least a portion of the rights information in response to the steps of decoding; and enforcing the rights information.

40. A method as in claim 26, including steps of performing a commercial transaction concurrently with communication between a license server and a user.

41. A method as in claim 40, wherein the steps of performing a commercial transaction include steps of receiving information at the license server sufficient to allow that license server to effect a purchase transaction by the user.

42. A method as in claim 40, wherein the steps of performing a commercial transaction include steps of receiving proof of purchase at the license server of a license by the user.

43. A method as in claim 26, including steps of performing mandatory security software by the secure processor.

44. A method as in claim 43, wherein the steps of performing mandatory security software include one or more of:

authenticating at least one of: a specific content element, a specific playback device or secure processor, a specific user;

enforcing comparison of an identity associated with the playback device with a tamper-proof identity available to the playback device or the secure processor, or to both in combination or conjunction;

enforcing comparison of rights information with an identity of selected content available to the playback-device or the secure processor, or to both in combination or conjunction;

enforcing computation of the secret key (using its private key and server public key) and decryption of the identities; and enforcing verification of a signature by the license server.

45. A method as in claim 26, wherein the steps of providing include steps of delivering the activation code from a license server to a user; and manually communicating the activation code from the user to the playback device or the secure processor.

46. A method as in claim 45, including steps of deriving license information from the activation code.

47. A method as in claim 45, including steps of decrypting content in response to the activation code.

48. A method as in claim 45, wherein the activation code includes a human-readable alphabetic, alphanumeric, numeric, or other character string.

49. A method as in claim 45, wherein the activation code includes a representation of at least a portion of a license message.

50. A method as in claim 45, wherein the steps of communicating the activation code include a human input device.

51. A method as in claim 45, wherein the steps of communicating the activation code include an input technique not part of the closed distribution system.

52. A method as in claim 45, wherein the steps of communicating the activation code include an SMS protocol.

53. A method as in claim 45, wherein the steps of communicating the activation code include a text messaging protocol.

54. A method as in claim 45, wherein the activation code includes a representation of a content decryption key.

55. A method as in claim 54, wherein the closed distribution system includes a public-key cryptosystem; and the content decryption key includes a decryption key privately associated with the content, encrypted by an encryption key publicly associated with a specific playback device.

* * * * *